R. DE LAN.
AUTOMATIC RECORD STOPPING DEVICE FOR TALKING MACHINES.
APPLICATION FILED DEC. 6, 1911.
1,042,535.
Patented Oct. 29, 1912.
2 SHEETS—SHEET 1.
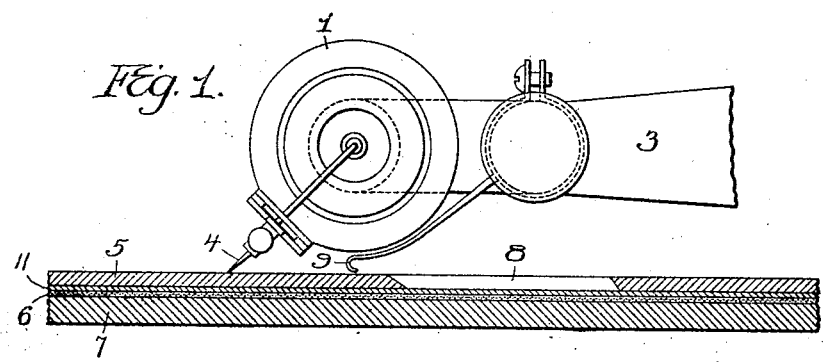
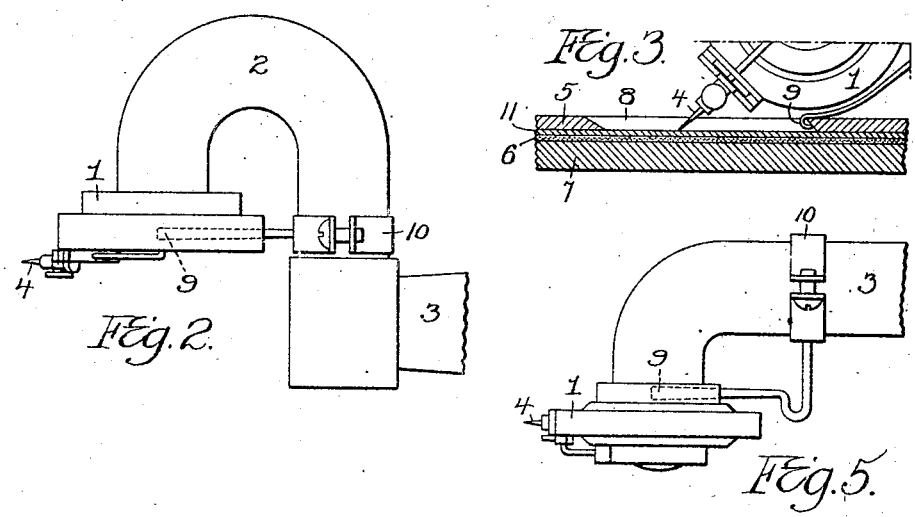
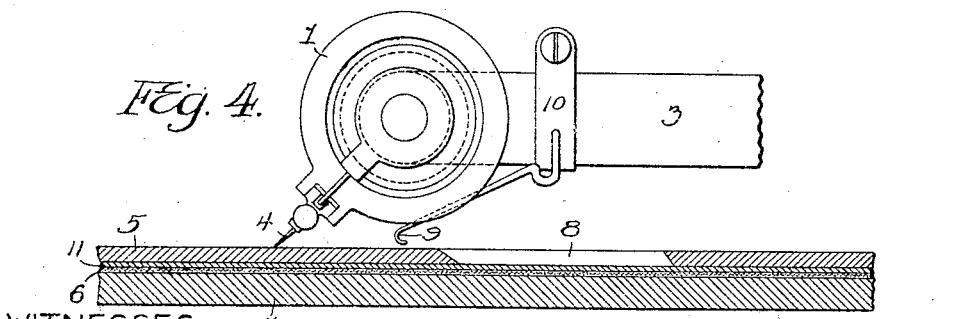
WITNESSES
Hamilton J. Turner
Kate A. Beadle
INVENTOR
RICHIE DE LAN
BY HIS ATTORNEY
Harry Smith R. DE LAN.
AUTOMATIC RECORD STOPPING DEVICE FOR TALKING MACHINES.
APPLICATION FILED DEC. 6, 1911.
1,042,535.
Patented Oct. 29, 1912.
2 SHEETS—SHEET 2.
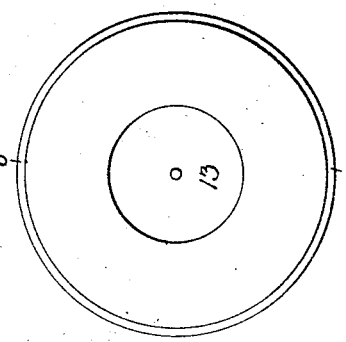
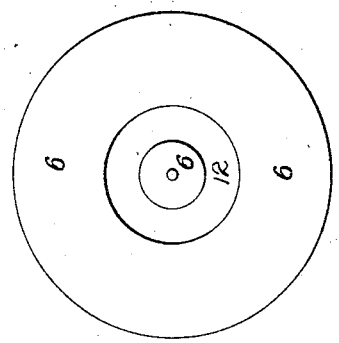
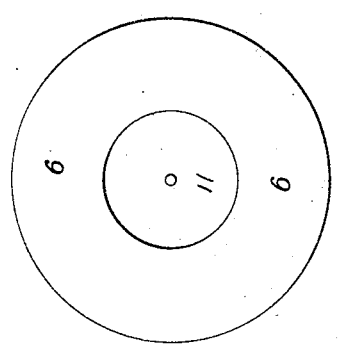
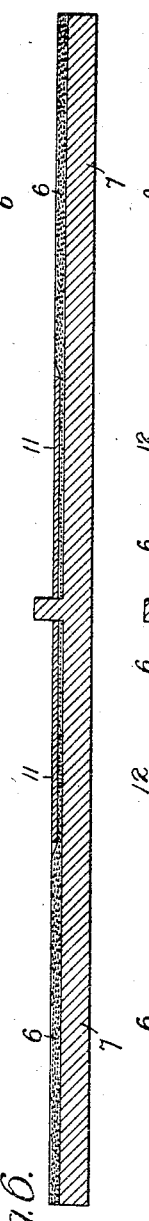
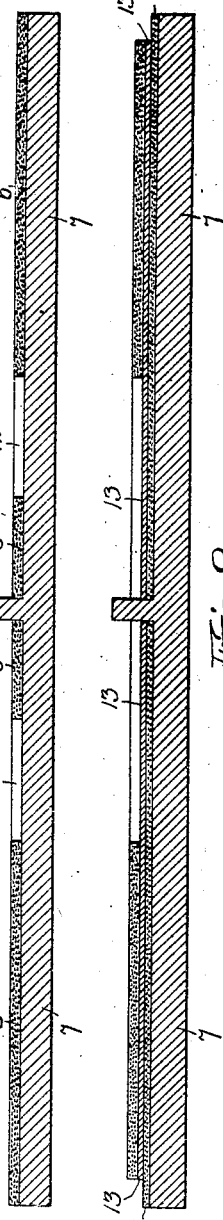
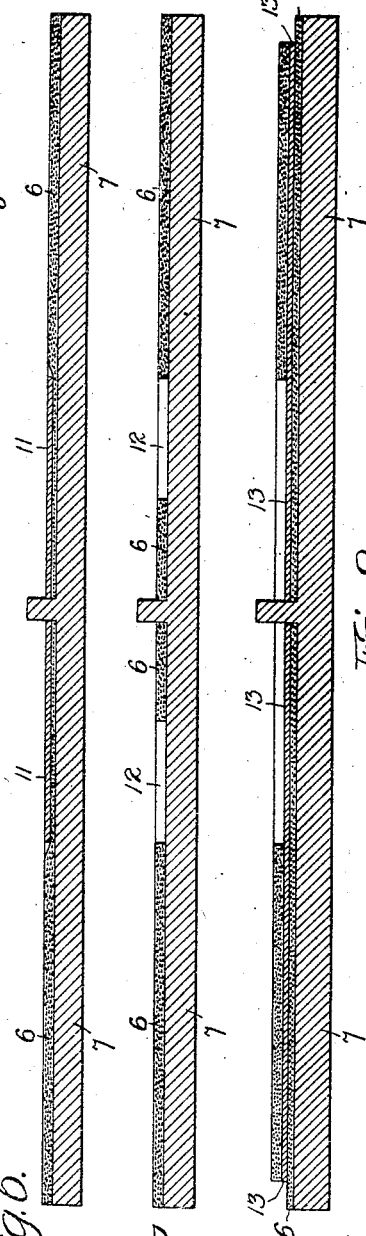
WITNESSES
INVENTOR
RICHIE DE LAN
BY HIS ATTORNEY
Harry Smith

A # UNITED STATES PATENT OFFICE.

RICHIE DE LAN, OF PHILADELPHIA, PENNSYLVANIA.

AUTOMATIC RECORD-STOPPING DEVICE FOR TALKING-MACHINES.

1,042,535.

Specification of Letters Patent.

Patented Oct. 29, 1912.

Application filed December 6, 1911. Serial No. 664,225.

*To all whom it may concern:*

Be it known that I, RICHIE DE LAN, a citizen of the United States, residing in Philadelphia, Pennsylvania, have invented certain Improvements in Automatic Record-Stopping Devices for Talking-Machines, of which the following is a specification.

The object of my invention is to provide simple and effective means for automatically stopping the rotation of the disk record of a talking machine when the end of the record is reached, an object which I attain in the manner hereinafter set forth, reference being had to the accompanying drawings, in which—

Figure 1 is a side elevation of one form of disk talking machine with a record-stopping device in accordance with my invention, the parts being in the position assumed when the end of the record is being approached; Fig. 2 is a plan or top view of the parts shown in Fig. 1; Fig. 3 is a view similar to Fig. 1, but showing the parts in the position assumed after the end of the record has been reached; Fig. 4 is a view similar to Fig. 1, but illustrating the application of my improved record-stopping device to a machine of a slightly different type from that shown in Fig. 1; Fig. 5 is a plan or top view of the parts shown in Fig. 4; Figs. 6 to 8 are sectional views illustrating different constructions of turntables for use in connection with my improved record-stopping attachment, and Figs. 9 to 11 are top views, on a reduced scale, of said turntables.

In Fig. 1 of the drawing, 1 represents the usual sound box hung by means of the gooseneck connection 2 to the free end of the swinging arm 3, the diaphragm of the sound box being acted upon by the stylus 4 which is actuated by the grooves of the record so as to vibrate the diaphragm and reproduce the sounds represented by the grooves of the record. The disk 5 carrying the record lies upon the baize-covered surface 6 of a turntable 7 which is rotated by means of a spring or other motor.

A serious objection to talking machines as now used arises from the necessity of stopping the rotation of the turntable as soon as the reproduction of the record has been completed, and it is the object of my invention to dispense with this necessity. This object I attain by forming in the record disk, at the end of the record thereon, an opening for the reception of a hook carried by the sound box arm and serving by engagement with the advancing wall of said opening to arrest the further rotation of the record disk after the end of the record has been reached, the disk, by reason of its contact with the baize covered surface of the turntable, then acting as a friction brake and gradually bringing the turntable itself to a standstill.

In Figs. 1, 3 and 4 of the drawing, the opening in the record-disk is represented at 8 and the engaging hook at 9, said hook projecting from a clamp ring 10 which engages some convenient part of the sound box carrying arm, as shown in Figs. 2 and 4. The hook 9 bears such relation to the end of the stylus 4 that when the latter is traveling in the groove of the record the hook will be above and free from contact with the surface of the record disk, but, as soon as the needle falls into the opening 8 in the record disk, the hook will be permitted to descend to a point below the top of the disk and will therefore engage and retain the advancing wall of the disk, as shown in Fig. 3. In order to prevent the stylus or hook from engaging and injuring the baize cover of the turntable the latter may have a thin metal plate applied to it throughout that portion with which the hook or needle is likely to come into contact, such plate being shown for instance at 11 in Figs. 1, 3, 4, 6 and 9, or the baize cover may be removed from the turntable throughout this area, as shown for instance at 12 in Figs. 7 and 10, or a special baize covered plate 13 (Fig. 11) may be applied to the ordinary baize-covered turntable, the baize cover being removed from this plate throughout the area likely to be engaged by the retaining hook or stylus 4. The hook 9 is preferably undercut, as shown in the drawings, and the advancing wall of the opening 8 is likewise undercut so as to prevent the hook from being disengaged from the advancing wall of the opening when it comes into contact with the same, although a hook having a right-angled bend and a record disk having an opening with straight wall might be used, if desired. The forward end of the opening 8 is preferably beveled as shown in Figs. 1, 3 and 4, so as to permit the stylus 4 to slide gently down into the opening, and the term "opening" as used in this specification is also intended to cover a recess which does not extend completely through the record disk, the latter form of opening being preferred however, as being the easier to produce.

I claim:

1. The combination of the record-carrying turntable of a talking machine, and the sound-box carrying arm, with a record disk having an opening therein at the end of the record, and a hook for engaging with the advancing wall of said opening and arresting the further rotation of the record.

2. The combination of the record-carrying turntable of a talking machine, and the sound-box carrying arm, with a record disk having an opening therein at the end of the record, and a hook for engaging with the advancing wall of said opening and arresting the further rotation of the record, the hook being inturned and the advancing wall of the opening in the record being undercut.

3. The combination of the baize covered record-carrying turntable of a talking machine, and the stylus-carrying sound-box, with a record disk having an opening therein at the end of the record, a hook for engaging with the advancing wall of said opening and arresting the further rotation of the record, and means for preventing contact of the stylus and hook with the baize-covering of the turntable when said stylus and hook enter the opening in the record disk.

4. The combination of the record-carrying turntable of a talking machine and the stylus-carrying sound-box, with a record disk having an opening therein at the end of the record, and a hook for engaging with the advancing wall of said opening and arresting the further rotation of the record, said hook bearing such relation to the stylus that it will be supported in position above the top of the record while the stylus is in engagement with the record groove.

In testimony whereof, I have signed my name to this specification, in the presence of two subscribing witnesses.

RICHIE DE LAN.

Witnesses:
 KATE A. BEADLE,
 HAMILTON D. TURNER.